Figure 5:
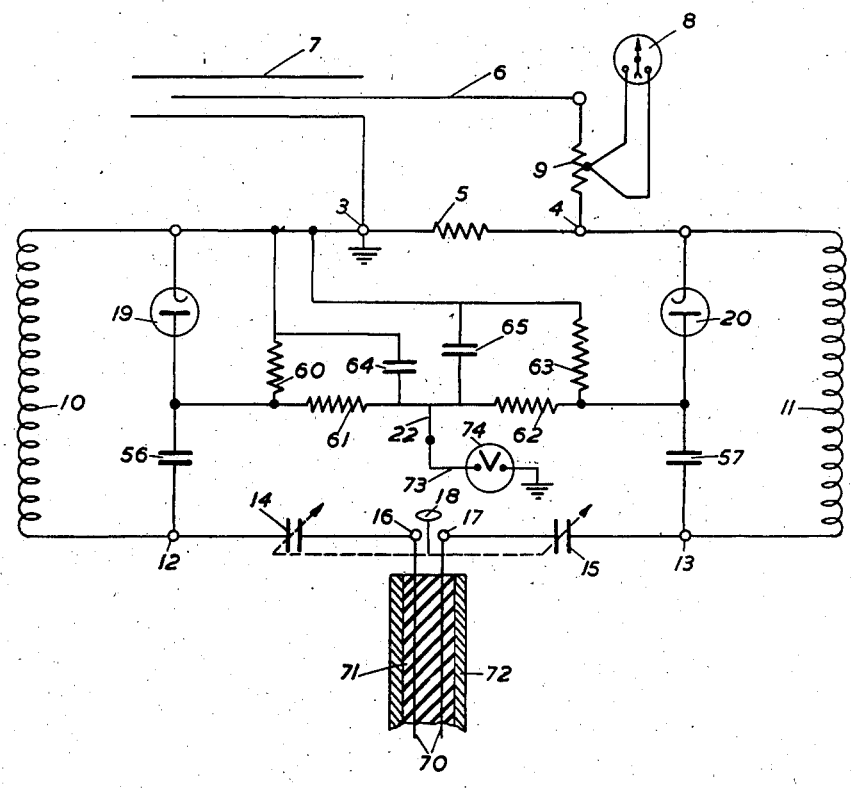

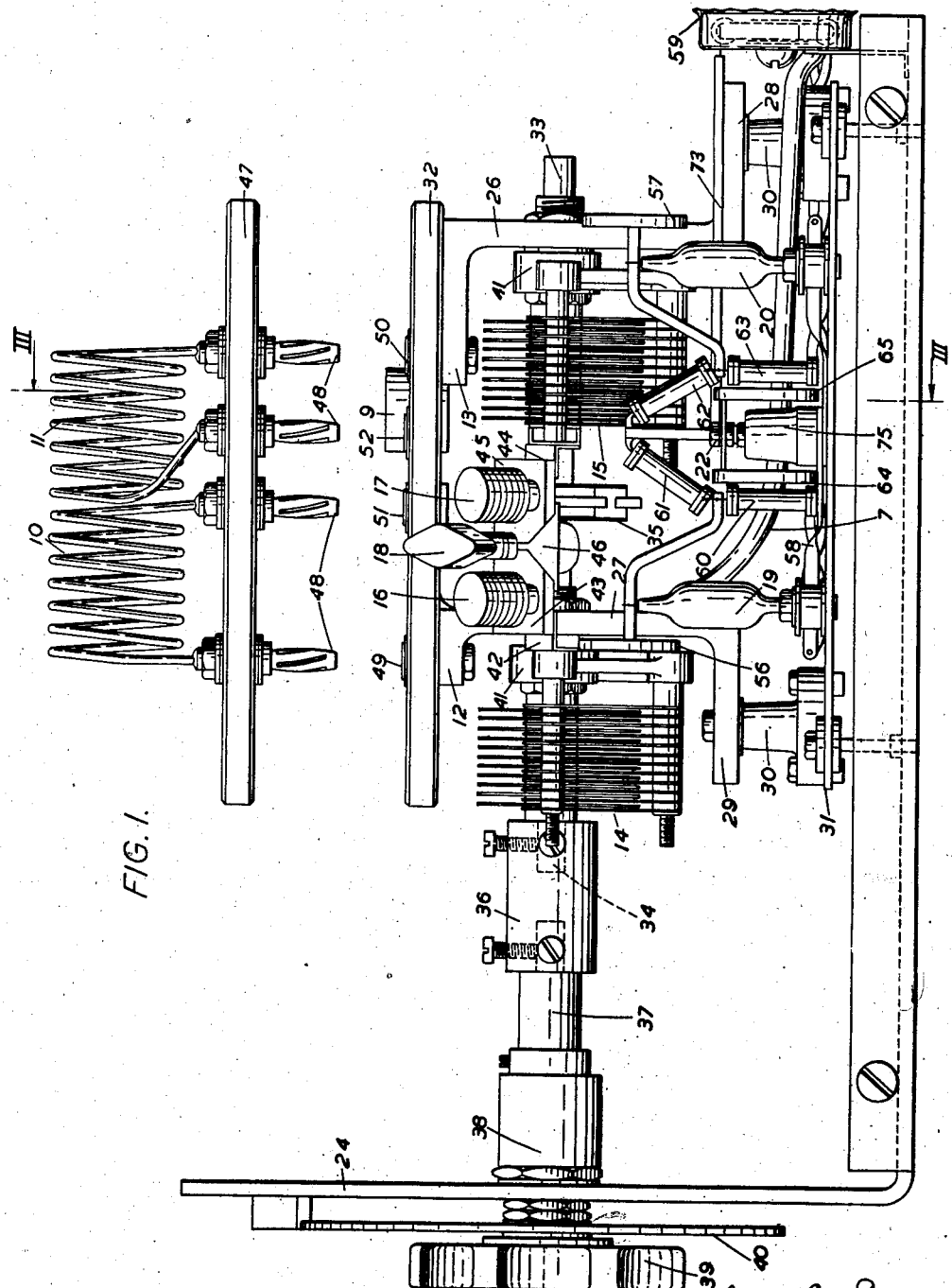

May 18, 1943. J. C. QUAYLE 2,319,475
ARRANGEMENT FOR THE MEASUREMENT OF ELECTRICAL IMPEDANCE
Filed Sept. 3, 1941 4 Sheets-Sheet 2
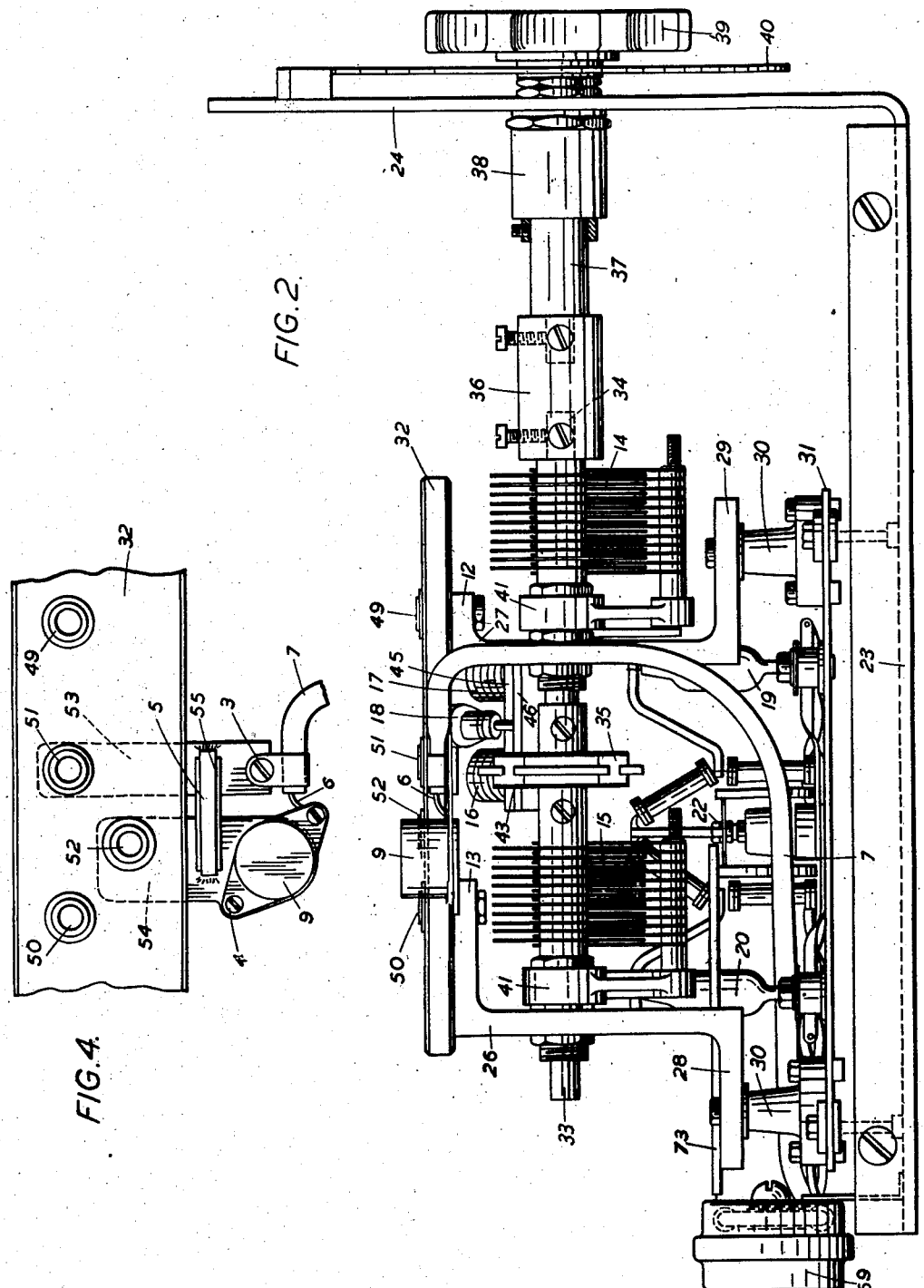
INVENTOR
Joshua Creer Quayle
BY Stebbins and Blenko
ATTORNEY

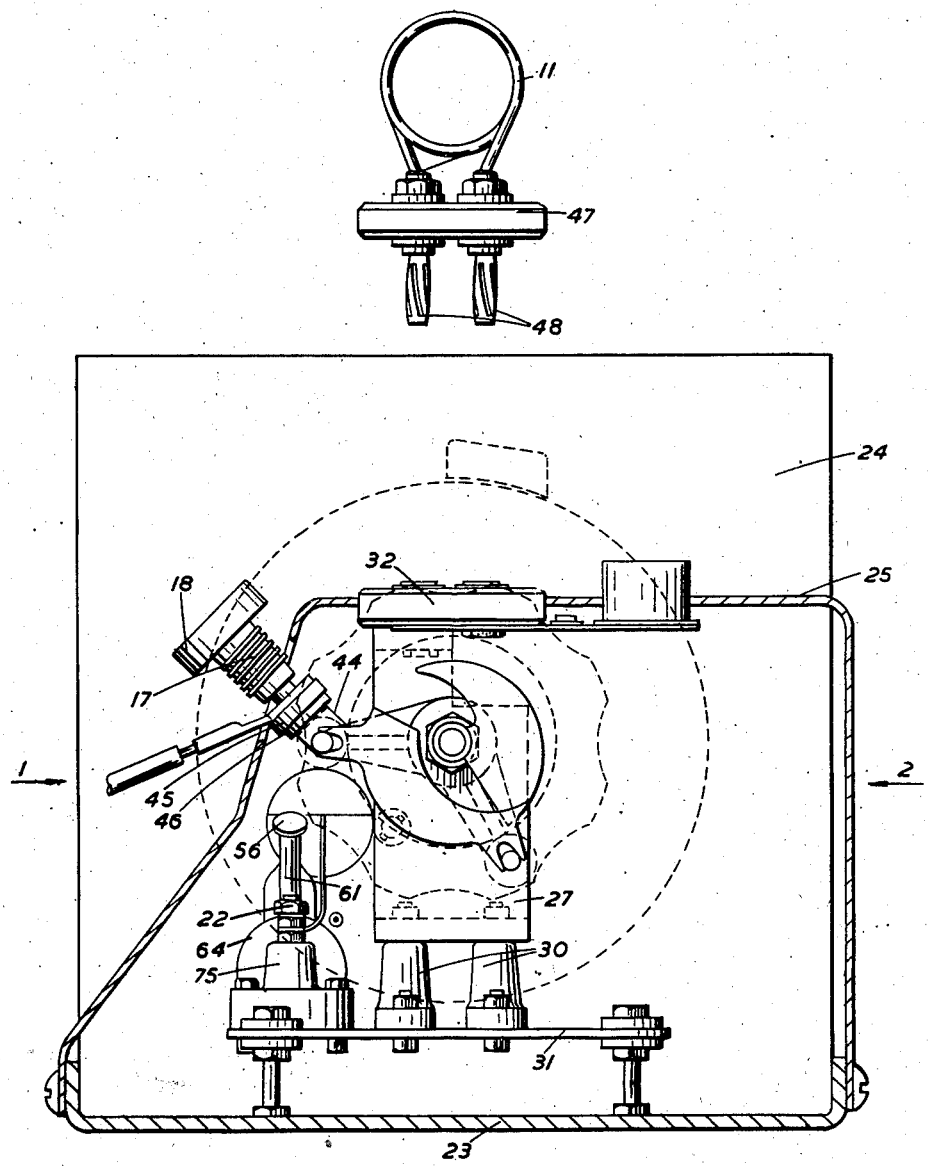

Patented May 18, 1943

2,319,475

UNITED STATES PATENT OFFICE 2,319,475

ARRANGEMENT FOR THE MEASUREMENT OF ELECTRICAL IMPEDANCE

Joshua Creer Quayle, Helsby, England, assignor to British Insulated Cables Limited, Prescot, Lancashire, England, a British Company Application September 3, 1941, Serial No. 409,377 In Great Britain September 9, 1940

6 Claims. (Cl. 175—183)

This invention is concerned with the measurement of the impedance of an electrical element by the known method based on ascertaining the voltage magnification of a series resonant circuit. In obtaining the value of this magnification a circuit comprising inductance and capacity in series has applied to it an alternating voltage and is adjusted to resonance. The voltage applied across the two elements in series is measured and the voltage across one of these elements is also measured, the magnification being the ratio of the latter voltage to the former. The applied voltage may be conveniently measured by way of the current in a standard resistance connected across the resonant circuit. This current can be measured by a thermo-element and associated instrument of known kind. The voltage across the inductance or capacity is preferably measured by a valve voltmeter.

The ratio of the voltage across an impedance element to the applied voltage, which is equal to the ratio of the inductive reactance to the resistance in the resonant circuit, is often denoted by Q and accordingly a measuring arrangement of the kind indicated is frequently spoken of as a "Q-meter."

In using the arrangement, the magnification is measured before and after inserting the unknown impedance. This unknown impedance is included in the appropriate part of the circuit, that is in series or in shunt, according as the unknown impedance has a low or high value compared with the impedance of the original inductance or capacity.

As usually arranged the resonant circuit in a Q-meter has one end earthed. This has imposed certain limitations on the form of the impedance which can be inserted in it for the purpose of measurement. It is limited to those impedances in which one terminal is earthed. It can be used effectively for instance in measuring the capacity and/or the losses of a length of cable of a form comprising a conductor and sheath, but it is not adapted for measuring the capacity between two conductors enclosed within a single sheath, which, in effect, must form an earth connection not anchored to either terminal.

The invention provides an improved form of Q-meter, in which an impedance having terminals symmetrically placed in relation to earth can be measured. It can accordingly deal with the case of two conductors within a sheath such as are used in certain forms of low-capacity, high-frequency communication cables.

In the improved arrangement, the permanent inductance and capacity elements of the resonant circuit are split into two equal halves and there is provision for inserting the unknown impedance between the two halves of the appropriate circuit impedance element and the magnified voltage is applied to two valves connected in a symmetrical arrangement across two half impedances. These valves form part of the voltage measuring device. The output from them is preferably taken through the centre point of a resistance connecting them. The circuit is anchored to earth at a point so placed that it is symmetrical in the circuit in relation to the earth connection applied by the impedance element to be measured.

The mechanical construction and the relative disposition of the parts of this arrangement are of importance, since it is necessary to keep connections as short as possible to avoid the introduction of unwanted inductive elements. The invention, accordingly, also comprises a form of construction of apparatus as hereinafter set out.

The invention will be further described by the aid of the accompanying drawings, of which Figures 1–4 show a form of construction of measuring device in accordance with the invention and Figure 5 is a diagram of the circuit of the device and associated apparatus.

Figures 1 and 2 are side elevations from opposite sides, as indicated by arrows marked 1 and 2 in Figure 3. Figure 3 is a section on the line III—III of Figure 1 and Figure 4 is a partial plan view showing the socket plate and parts directly associated with it. The coils are shown in side elevation in Figure 1 and in end elevation in Figure 3, in position above but lifted from their sockets. The same reference numerals are used on the diagram, Figure 5, as on the other figures of the drawings for the same parts.

Reference will first be made to Figure 5. The external voltage for use in testing is applied to terminals 3 and 4 across which a measuring resistance 5, having a low value, is arranged. The supply being at high frequency is conveyed by a co-axial cable, the inner conductor of which is indicated at 6 and the outer conductor at 7. An indication of the strength of the current is given by the meter 8, which is coupled between the conductor 6 and terminal 4, by the thermo junction 9. To the terminal 3 is connected one end of the coil 10 and to the terminal 4 one end of the coil 11. The two coils are similar and together provide the inductive part of the resonant circuit. To the other terminals of these coils 10 and 11 are connected respectively, one terminal 12 and 13 of each of two similar variable condensers 14 and 15, which are completely insulated from earth and are mechanically coupled. To the other terminals 16 and 17 of these condensers are connected the test impedance, which is shown as a twin cable comprising cores 70, insulating material 71 and sheath 72. Convenient means for short-circuiting these terminals 16 and 17 is provided at 18. Across each of the coils 10 and 11 is connected one of the diodes 19 and 20, the cathodes being joined to the input terminal 3. The anodes are connected together by a high resistance 61, 62 from the centre point of which a lead to a terminal 22 is taken. From this a connection 73 goes to a voltmeter 74 either directly, as shown, or through an amplifier. In parallel with the diode 19 is connected the resistance 60 and across the resistances 60 and 61 is placed the condenser 64. The resistance 63 and condenser 65 are similarly placed in relation to the diode 20 and the resistance 62.

For rigorous balance the earth connection at the input side of the circuit should be made at the centre of the measuring resistance 5. Since, however, this resistance is very small compared with the other impedances in the circuit, there is no serious loss of accuracy in making the earth connection at one end of this resistance as shown in Figure 5.

The measuring device is built up on a frame consisting of a base 23 and an end plate 24. It may be enclosed by a cover 25, as shown in Figure 3. This cover is not shown in other figures.

The principal structural element is a variable condenser comprising the two sections 14 and 15. The two sections are completely insulated, both rotor and stator, from each other and from earth. An important feature of each section is a massive metal end piece 26 and 27 which is in the form of a flat bar with two offset ends. Each of the lower offsets 28 and 29 serves as a supporting foot and rests on and is connected to insulating pillars 30. These pillars are carried on a sub-base 31, supported from the main base at a short distance above it. The upper offset ends, which lie above the condenser sections, serve as connections to and supports for the two coils 10 and 11. They also support a plate 32 of insulating material which carries the sockets for the coil and certain other parts.

In each of the end pieces 26 and 27 is provided a bearing for the rotor shaft of the adjacent condenser section. These two shafts 33 and 34 are connected end to end by an insulating coupling 35. There is metallic contact between the shaft 33 and the end piece 26 and between the shaft 34 and the end piece 27, so that the upper offset portions of these end pieces serve as the terminals 12 and 13 for the movable parts of the condenser sections. By means of a substantial insulating sleeve 36, one end of the condenser shaft 34 is connected mechanically with, but held apart electrically from, the driving shaft 37, which is coupled through the reducing gear 38 with the operating handle 39 and dial 40 carried by the end plate 24.

The stator of each condenser section has an end member 41 of insulating material which is carried on and located by the end pieces 26 and 27 respectively. The stator of the condenser 14 is provided with a metal bracket 42, which connects with terminal plate 43 carrying terminal 16. Similarly, the stator of condenser 15 is connected by a bracket 44 with a terminal plate 45 which carries terminal 17. The terminal plates 43 and 45 and brackets 42 and 44 are connected by an insulating plate 46. The two terminal plates 43 and 45 are spaced apart by a short distance. They may be connected together by the short-circuiting plug 18, shown in position.

The two coils 10 and 11 are mounted on an insulating plate 47, as shown in the upper parts of Figures 1 and 3, and the connections from the coils to the rest of the circuit are made by the four pins 48 which enter into correspondingly placed sockets in the plate 32. The two end sockets 49 and 50 are carried directly by the terminal ends 12 and 13 respectively of the condenser end pieces 27 and 26 and also serve to secure the plate 32 to those end pieces, which support it. As best seen in Figure 4, the other two sockets 51 and 52 are connected to the terminals 3 and 4 at which the high frequency alternating current is applied. The connection is from the terminal 3 to the socket 51 by the strip of metal 53, which is attached to the lower surface of the plate 32 by the socket 51. The socket 52 is connected to the terminal 4 by the strip of metal 54, which is held against the underside of the plate 32 by the socket 52. The resistance 5 is connected across these strips 53 and 54, its ends being soldered to the strips, and its main part separated from the strips by the interposition of a strip of mica 55.

The outer conductor 7 of the co-axial cable for supply of high frequency current is clipped on to the terminal 3 as shown in Figure 4 and forms the earthing connection for it. The inner conductor 6 is taken to the terminal 4 by way of the heater wire in the thermo-junction 9. The connections from this junction to the external instrument 8 are not shown nor is the instrument 8 shown.

The co-axial cable is shown in Figures 1 and 2. It is omitted from Figure 3 to avoid difficulty due to it obscuring other parts.

Between the anode of the valve 19 and the end piece 27 of the condenser 14 is connected the coupling condenser 56. The coupling condenser 57 is similarly associated with the anode of the valve 20 and the end piece 26 of the condenser 15.

The two valves 19 and 20 are mounted in holders on the sub-base 31 and are fed with heating currents for their cathodes by way of the leads 58 fed from an external supply through a screened socket 59. The cathodes are connected to earth by way of the sub-base 31.

This socket 59 also provides a way for the connection between the lead 73 from terminal 22 and the voltmeter arrangement. The co-axial cable 6, 7, makes connection with the external supply of high frequency current through the socket 59.

The sub-base 31 and the base 23 are earthed. On this sub-base the terminal 22 is supported by the insulator 75. The resistances 60 and 63 are supported on the sub-base 31 and connected to it at their lower ends. At their upper ends they are connected to the anodes of the diodes 19 and 20 and to the resistances 61 and 62 which at their other ends are connected together and to terminal 22.

The Q-meter, in accordance with the invention, is intended for making a variety of measurements, including capacity, inductance, magnification, impedance and attenuation. The following description shows the procedure to be followed.

To measure the magnification of a balanced twin coil, the input current I is measured on meter 8. If r is the magnitude of resistance 5, then the injected voltage equals $Ir$. The resonant voltage $V$ developed across the coils is measured by the meter 74. Then the magnification of the coil equals $V/Ir$.

For components other than coils, the method depends on the change of magnification of the tuned circuit when the component is connected to it.

Capacities are connected across terminals 12 and 13, plug 18 being left in; while inductances are connected in series with terminals 16 and 17, plug 18 being removed to insert the unknown inductance into the circuit.

To measure the magnitude of a balanced inductance of self capacity $C_0$, set the tuning condenser to a capacity $C_1$ and adjust the frequency $f$ of the input current until resonance occurs as shown by maximum response of the valve voltmeter 74. Then the unknown inductance in microhenries, equals $$\frac{10^6}{39.5 f^2 (C_1 + C_0)}$$

($f$ is the frequency of the alternating current).

To measure a balanced capacity, set the tuning condenser to a value $C_1$ near maximum, with an inductance in circuit suitable for tuning this capacity to the required frequency. Tune the oscillator to resonance. Connect the unknown capacity $C$ to terminals 12 and 13 and reduce the tuning capacity to a value $C_2$ to obtain resonance again. Then $C_x = C_1 - C_2$.

The impedance and attenuation of balanced cables can be measured by the well-known techniques of treating them as resonant lines; or by measuring their reactive and resistive components of impedance when open and short-circuited at the far end.

Where the phrase "a similar impedance" or "similar impedances" is used in the following claims it is intended to indicate that two impedances are of the same kind, e. g. both capacitative impedances or both inductive impedances.

What I claim as my invention is:

1. A Q-meter comprising an inductance element and a capacity element in series, adjustable to resonance, and an earth connection, said inductance and capacity elements being each in two equal parts arranged symmetrically relative to said earth connection, means permitting the insertion of an impedance to be tested between the two parts of one of said impedance elements, two rectifying valves connected in a symmetrical arrangement one across each of the parts of one of said impedance elements, measuring means for ascertaining the voltage applied to the meter, and measuring means for ascertaining the voltage across one of said impedance elements.

2. A Q-meter comprising two coils, of equal inductance, two equal variable condensers, insulated from earth and from each other and mechanically coupled together, and an earth connection, the coils and condensers being connected electrically in two series groups, simultaneously adjustable to resonance, which groups are symmetrical about the said earth connection, means for applying an alternating voltage between one pair of ends of the said groups, means for measuring said voltage, means for inserting an impedance to be tested between two symmetrical points in the said groups, two rectifying valves each connected across a similar impedance in one of the groups and means for indicating the voltage rectified thereby.

3. A Q-meter comprising two coils, of equal inductance, two equal variable condensers, insulated from earth and from each other and mechanically coupled together, and an earth connection, the coils and condensers being connected electrically in two series groups, simultaneously adjustable to resonance, which groups are symmetrical about the said earth connection, means for applying a measured alternating voltage between one pair of ends of the said groups, means for inserting an impedance to be tested between two symmetrical points in the said groups, two rectifying valves each connected across a similar impedance in one of the groups and a resistance connecting the anodes of the said valves and a measuring instrument connected to the mid-point of said resistance and to earth.

4. A Q-meter comprising two coils of equal inductance, two equal variable condensers, insulated from earth and from each other and mechanically coupled together, a resistance of low value and earth-connected, the coils and condensers being connected electrically in two similar series groups, simultaneously adjustable to resonance, which groups are symmetrical about the said resistance which is connected between one pair of ends of the said groups, removable means for connecting directly together the other pair of ends of the said groups, means for inserting between the last mentioned ends an impedance to be tested, two rectifying valves each connected across a similar impedance in one of the groups and measuring means for ascertaining the applied voltage and the voltage across one of said impedance elements.

5. A Q-meter comprising an inductance element and a capacity element in series, adjustable to resonance, and an earth connection, said inductance and capacity elements being each in two equal parts arranged symmetrically relative to said earth connection, means permitting the insertion of an impedance to be tested between the two parts of one of said impedance elements, a symmetrical two-valve thermionic rectifying device connected across the parts of the other of said impedance elements and a measuring instrument connected to a mid-point of said device and to earth.

6. A Q-meter comprising two equal variable condensers insulated from earth and from each other and mechanically coupled in line, two metal end pieces supporting said condensers and each electrically connected to a rotor thereof, a resistance of low value, an insulating plate carried by said end pieces and carrying four connecting devices, two of which make connection with said end pieces and the other two of which connect with and carry the said resistance, a second insulating plate carrying two equal coils and four connecting members mating with said devices and acting as terminals for said coils, a pair of brackets, one carried by each stator of said condensers and serving as an electrical connection therefor, a test-connection terminal mounted on each of said brackets and two rectifying valves mounted close to the condensers and each connected between one of said end pieces and the said resistance.

JOSHUA CREER QUAYLE.